United States Patent
Chrysos et al.

(10) Patent No.: US 9,148,377 B2
(45) Date of Patent: Sep. 29, 2015

(54) METHOD AND SYSTEM FOR TRANSMITTING DATA PACKETS IN A NETWORK

(75) Inventors: Nikolaos Chrysos, Thalwil (CH); Cyriel J. Minkenberg, Gutenswil (CH)

(73) Assignee: International Business Machines Corporation, Armonk, NY (US)

(*) Notice: Subject to any disclaimer, the term of this patent is extended or adjusted under 35 U.S.C. 154(b) by 201 days.

(21) Appl. No.: 13/881,754

(22) PCT Filed: Aug. 4, 2011

(86) PCT No.: PCT/IB2011/053475
§ 371 (c)(1),
(2), (4) Date: Jun. 12, 2013

(87) PCT Pub. No.: WO2012/056335
PCT Pub. Date: May 3, 2012

(65) Prior Publication Data
US 2013/0258856 A1 Oct. 3, 2013

(30) Foreign Application Priority Data
Oct. 28, 2010 (EP) .................................. 10189166

(51) Int. Cl.
*H04L 12/26* (2006.01)
*G08C 15/00* (2006.01)
*H04J 1/16* (2006.01)
*H04L 12/28* (2006.01)
*H04L 12/803* (2013.01)
*H04L 12/933* (2013.01)
(Continued)

(52) U.S. Cl.
CPC .......... *H04L 47/125* (2013.01); *H04L 49/1507* (2013.01); *H04L 49/50* (2013.01); *H04Q 3/68* (2013.01)

(58) Field of Classification Search
None
See application file for complete search history.

(56) References Cited

U.S. PATENT DOCUMENTS

| 7,035,220 B1* | 4/2006 | Simcoe ........................ 370/236 |
| 2009/0052318 A1* | 2/2009 | Gershinsky et al. .......... 370/229 |
| 2010/0202449 A1* | 8/2010 | Moscibroda et al. ......... 370/389 |

FOREIGN PATENT DOCUMENTS

| TW | 201008181 A1 | 2/2010 |
| TW | 201014395 A1 | 4/2010 |
| TW | 201032619 A1 | 9/2010 |

OTHER PUBLICATIONS

Chang et al. "Load-balanced Birkhoff-von Neumann switches, part I: one-stage buffering," Elsevier Computer Communications, vol. 25, No. 6, pp. 611-622, Apr. 2002.

(Continued)

*Primary Examiner* — Kiet G Tang
(74) *Attorney, Agent, or Firm* — Cantor Colburn LLP (57) ABSTRACT

A method for transmitting data packets from a first node to a second node. The method includes transmitting the data packet from the first node to the one second node where each data packet is determined to be sent according to a first or a second transmission mode, where, in the first transmission mode, the data packet is transmitted to the second node according to a prescheduled scheme, where the prescheduled scheme defines a cyclic one-to-one assignment between first and second node over time slots so that the data packet is forwarded to the second node during that time slot the one-to-one assignment of which assigns the first node with the one second node and in the second transmission mode, the data packet is transmitted during an actual time slot to the second node while overruling the prescheduled scheme.

20 Claims, 4 Drawing Sheets

(51) Int. Cl.
*H04L 12/931* (2013.01)
*H04Q 3/68* (2006.01)

(56) References Cited

OTHER PUBLICATIONS

Isaac Keslassy, Shang-Tse Chuang, Nick McKeown: "A Load-Balanced Switch with an Arbitrary Number of Linecards", Proceedings of IEEE Infocom '04, Hong Kong, Mar. 2004.
Keslassy et al."Scaling internet routers using optics" SIGCOMM '03. ACM, New York, NY, USA, 189-200.
Keslassy et al., "Maintaining packet order in two-stage switches",INFOCOM 2002. Twenty-First Annual Joint Conference of the IEEE Computer and Communications Societies.
"Analysis of the parallel packet switch architecture", S. Iyer, IEEE/ACM Transactions on Networking, vol. 11, No. 2, Apr. 2003.
Chang et al., "Providing guaranteed rate services in the load balanced Birkhoff-von Neumann switches," Networking, IEEE/ACM Transactions on , vol. 14, No. 3, pp. 644-656, 2006.
Kishimoto, R. and Sakurai, N. (1990), Self-routing benes network distributively controlled by dynamic load balance. Electron. Comm. Jpn. Pt. I, 73: 1-11.

* cited by examiner

METHOD AND SYSTEM FOR TRANSMITTING DATA PACKETS IN A NETWORK

CROSS-REFERENCE TO RELATED APPLICATION

This application is a National Phase Application based on PCT/IB2011/053475 which claims priority from European Patent Application No. 10189166.1 filed Oct. 28, 2010, the entire contents of both of which are incorporated herein by reference.

TECHNICAL FIELD

The present invention relates to interconnection networks, in particular, to schemes for transporting a packet from an input node to an output node of an interconnection network. Furthermore, the present invention relates to the operation of load-balanced networks under low load conditions.

RELATED ART

Interconnection networks, e.g. as used in data centers, usually have very demanding bandwidth and latency requirements since the same network infrastructure shall be usable for various applications with diverging requirements. Some applications, such as massive storage backups, just require high capacity communication channels that can be heavily utilized. On the other hand, applications like HPC (High Performance computing) are very sensitive to network latency. Hence, next generation general-purpose interconnection networks require an adjusted trade-off between network capacity, network throughput and network latency.

It is obviously difficult to provide an architecture that simultaneously addresses all of these aspects. For instance, a single-stage crossbar-based network equipped with a central scheduler, on the one hand, has a high throughput and low latency and, on the other hand, a strongly limited network capacity due to physical constraints. Furthermore, multi-stage networks scale to larger port counts offering higher capacity but have disadvantageously limited throughput and increased latencies while also having to cope with the possibility of congestion.

A load-balanced Birkhoff-von Neumann network as disclosed in C.-S. Chang et al., "Load-balanced Birkhoff-von-Neumann switches, part I: one-stage buffering", Elsevier Computer Communications, Vol. 25, No. 6, pp. 611-622, April 2002) provides an interconnection network with a distributed control which allows expanding to a very large number of ports into very high aggregate capacities. Although there is no central control the network can provide full throughput under any admissible traffic pattern, whether this be uniform or non-uniform. Furthermore, no congestion control is needed. Despite these advantages, one drawback of load balanced networks is their insufficient performance in terms of latency for the demanding environment of data centers.

The latency of a load balanced network at low utilization corresponds to O(N), where N is the number of network ports, i.e. the number of end nodes attached to the network. In a multi-thousand node network the resulting numbers are clearly intolerable for a wide range of applications. For instance, a data packet p which is send through a load balanced network that connects with 2048 end nodes may experience a delay of 2048 or more time slots in the network even if there are no other packets to compete with. Even for a low time slot duration of about 50 ns, the delay of conveying the data packet p through the network will be up to $\frac{1}{10}$ ms, which far exceeds the delay requirements for a data center.

It is therefore an objective of the present invention to combine the advantage of load balanced networks in terms of its control scheme, its guaranteed bandwidth, and its uncomplicated congestion resolution with the requirement of low latency.

SUMMARY OF THE INVENTION

This objective has been achieved by the method for transmitting one or more data packets via a network according to claim 1 and by the method for transmitting one or more data packets via an interconnection system, the network, and the interconnection system according to the further independent claim.

Further embodiments of the present invention are indicated in the dependent subclaims.

According to a first aspect, a method from transmitting one or more data packets from a first node to one of a number of second nodes connected by a switching network is provided. Therein, the data packet is transmitted from the first node to the one second node according to a transmission mode, wherein for each data packet it is determined whether it is sent according to a first or a second transmission mode, depending on a network condition. In the first transmission mode, the data packet is transmitted to the second node according to a prescheduled scheme, wherein the prescheduled scheme defines a cyclic one-to-one assignment between the first and the second node over time slots so that the data packet is forwarded to the second node during that time slot, the one-to-one assignment of which assigns the first node with the one second node. In the second transmission mode, the data packet is transmitted during an actual time slot to the second node while overruling the prescheduled scheme.

One idea of the present invention is to transport a data packet from a first node to one second node of a number of output nodes using different transmission schemes depending on a network condition. While in load-balanced networks a data packet is sent from a first node to a second node according to one of many prescheduled time slots, it can be provided that the data packet may be sent from the source node to the destination node in an exception to this prescheduled scheme, if the network condition allows.

The above method allows a decrease in the latency of the network using a prescheduled scheme for conveying data packets from a first node to a second node when the network condition allows. This method can also be beneficially applied to load-balanced networks having a two step policy for a standard delivery of data packets from a source node to a destination node via an intermediate node. According to the above method, data packets are allowed to be sent outside of the predetermined connection schedules.

Furthermore, it may be determined whether the data packet is transmitted to the second node according to the first transmission mode or the second transmission mode, depending on an indication of a network load. In particular, the indication of the network load is determined based on an amount of data packets buffered in the first node.

According to a further embodiment, a number of first nodes may be provided, wherein one or more of the first nodes and one or more of the second nodes are integrated in one physical device. The data packet is transmitted directly from the first node to the one second node, not via the switching network, if the first node and the one second node are integrated in the one physical device.

Moreover, the switching network may be a multi-stage switching network having a plurality of switching elements, arranged as a Banyan network or a Banyan equivalent network, wherein the switching elements may buffer data packets in different queues according to the transmission mode.

It may be provided that a plurality of data packets is transmitted, wherein at least at one of the switching elements of the switching network one of the plurality of data packets which is sent according to the first transmission mode is prioritized over another one of the plurality of data packets sent according to the second transmission mode.

In one of the switching elements, one of the plurality of data packets sent according to the second transmission mode may be dropped, if one of the plurality of data packets which is sent according to the first transmission mode is forwarded by the switching element.

According to a further aspect, a method for transmitting a data packet through an interconnection system having a number of source nodes, a number of intermediate nodes and a number of destination nodes is provided, wherein the source nodes and the intermediate nodes are connected via a first switching network, and the intermediate nodes and the destination nodes are connected via a second switching network, wherein the interconnection network is adapted to transmit the data packet from the source node to the intermediate node through the first switching network using the above method, and from the intermediate node to the destination node through the second switching network using the above method.

If the network condition allows, it can further be provided that the source node may send the data packet to an intermediate node to which the data packet can actually be sent in the current time slot. For the delivery of the data packet from the intermediate node to the destination node, the above method can be applied so that an exception can be made from the prescheduled scheme when the network condition allows, and the data packet is sent from the intermediate node to the destination node in a current time slot which is not the prescheduled time slot.

Furthermore, one or more of the intermediate nodes and one or more of the destination nodes may be integrated in one physical device, wherein the data packet is transmitted according to the second transmission mode from the source node to the intermediate node, if the destination node the data packet is to be sent to is integrated in the same physical device as the intermediate node.

It can be provided that the source node injects incoming data packets into the first switching network with an injection rate depending on a network load.

In particular, the network load is determined based on an amount of data packets buffered in the source node and/or intermediate node.

According to a further aspect a network for transmitting one or more data packets is provided. The network comprises:
a first node;
a number of second nodes;
a switching network connecting the first node with the number of second nodes, wherein the network is adapted to determine for each data packet whether it is sent according to a first or a second transmission mode, depending on a network condition,
wherein in the first transmission mode the data packet is transmitted to the second node according to a prescheduled scheme, wherein the prescheduled scheme defines a cyclic one-to-one assignment between the first and the second node over time slots so that the data packet is forwarded to the second node during that time slot the one-to-one assignment of which assigns the first node with the one second node;
wherein in the second transmission mode the data packet is transmitted during an actual time slot to the second node while overruling the prescheduled scheme.

According to a further aspect an interconnection system is provided. The network comprises:
a number of source nodes,
a number of intermediate nodes;
a number of destination nodes,
a first switching network for connecting the source nodes and the intermediate nodes; and
a second switching network for connecting the intermediate nodes and the destination nodes,
wherein the interconnection network is adapted to transmit the data packet from the source node to the intermediate node through the first switching network using the above method, and from the intermediate node to the destination node through the second switching network also using the above method.

According to a further aspect, a computer program product is provided comprising software code portions loadable into an internal memory of a data processing unit, wherein, when the software code portions are executed on the data processing unit, the above steps are performed in a network.

BRIEF DESCRIPTION OF THE DRAWINGS

Preferred embodiments of the present inventions are described in detail in conjunction with the accompanying drawings in which.

DESCRIPTION OF PREFERRED EMBODIMENTS

Figure 1:
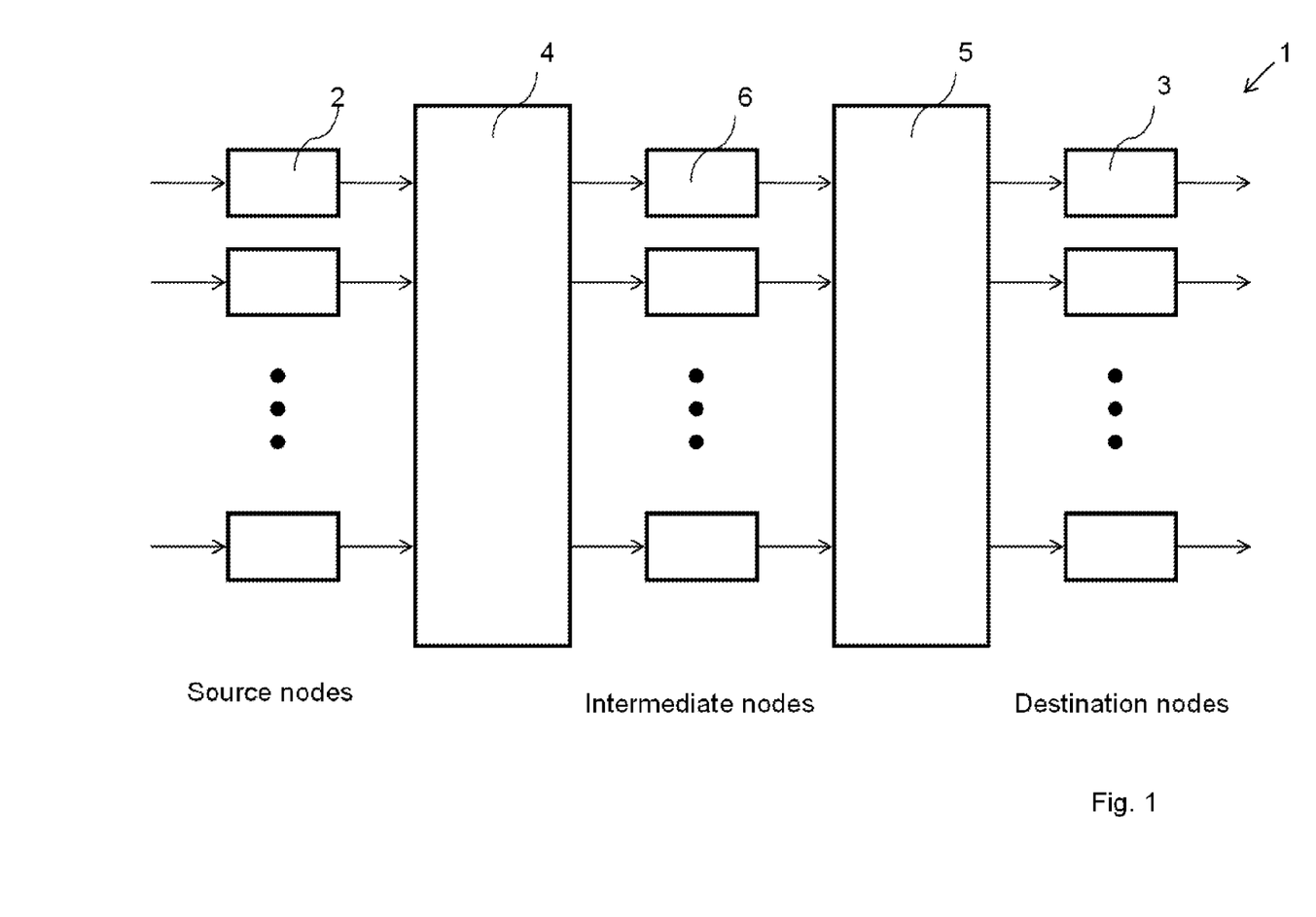
FIG. 1 shows a generic load balanced network.

FIG. 1 schematically shows a logical implementation of a generic load-balanced interconnection network 1. The network 1 has a number of N source adapters 2 where the data packets enter the interconnection network 1. Furthermore, N destination nodes 3 are provided where the data packets depart. The interconnection network 1 has two switching networks, a first and a second switching network 4, 5, which are separated by an intermediate stage of N intermediate nodes 6 which buffer the data packets travelling from the source nodes 2 to the destination nodes 3. The first switching network 4 is adapted to connect the source nodes 2 to intermediate nodes 6 and the second switching network 5 is adapted to connect the intermediate nodes 6 to the destination nodes 3.

In the load-balanced network of FIG. 1, the first switching network 4 serves to distribute the load of traffic that enters from each specific source node 2 and is destined to a specific destination node 3 uniformly over all intermediate nodes 6. Routing data packets from the intermediate nodes 6 to the destination nodes 3 is achieved using the second switching network 5. All network operation in the load-balanced network of FIG. 1 is generally performed in a time slotted fashion.

Data packets arriving at the source nodes 2 at a given time slot are routed through the first switching network 4 according to a one-to-one assignment (permutation) of source nodes 2 to intermediate nodes 6, regardless of the destination node 6 of the respective data packet. This assignment is shifted in a cyclic fashion from one time slot to the next time slot so that each one-to-one assignment of a source node 2 to an intermediate node 6 is served exactly once over the course of N time slots.

Usually, load-balanced networks do not need queues for buffering data packets in the source nodes 2 as in general, incoming data packets are immediately forwarded to the respective intermediate node 6 as determined by the one-to-one assignment at the current time slot. Hence, the buffering of incoming data packets is performed by the intermediate nodes 6.

Each intermediate node 6 has a number of N virtual output queues, one for each connected destination node 3 in which it stores the received incoming data packets according to the address of the destination node 3 they shall be sent to. In the second switching network 5 the data packets in each of the intermediate nodes 6 are served according to a one-to-one assignment of the N virtual output queues of the intermediate nodes 6 to the N destination nodes 3. The one-to-one assignment is shifted in synchronization with the first switching network 4 in a cyclic fashion from time slot to time slot so that each connection between one intermediate node to one output node 3 is served exactly once in every N time slots. The key difference in service discipline with respect to the first switching network 4 is that in the second switching network 5, the data packet is served only if it can be routed to its desired destination node 3.

Due to the uniform data distribution in the intermediate nodes 6, the incoming load onto every virtual output queue at the intermediate nodes 6 will be below 1/N for admissible traffic. Hence, the second switching network 5 can handle the load of all virtual output queues of the intermediate nodes 6 by serving each one of them once every N time slots. The load-balanced network 1 achieves this using a fixed periodic schedule that circularly selects a set of intermediate node 6 to destination node 3 assignments, each arising once every N time slots. The traffic distribution can also be realised if the first switching network 4 circularly visits a set of fixed source node-to-intermediate node permutations. Each one arises once every N time slots. This operation scheme is sufficient for a load-balanced network to guarantee a throughput with an admissible mean rate for any input traffic.

The simple distribution control of load-balanced networks according to the above described topology allows scaling to a very large number of ports and to high aggregate capacities. Further, the load-balanced network can provide full throughput under any admissible traffic pattern and the possibility of congestion trees is eliminated. However, the main drawback of such a network is the network latency. Even at extremely low utilization rates a packet may need up N time slots to reach its destination, where N is the number of network ports and a time slot is the duration of a fixed-size packet on the link. This latency is mainly incurred in the intermediate node 6 where a data packet may have to wait for up to N−1 time slots for an opportunity for service to its destination node.

Each node is assigned a unique number from 0 to N−1. A time slot t, a source node 2 with a number k sends a data packet to an intermediate node (t+k) mod N. Since data packets that source node 2 injects in every specific time slot are destined for different intermediate nodes 6, there is no output contention possible in the first switching network 4. Similarly, at time slot t, the intermediate node 6 with number k serves the virtual output queue assigned to the destination node (t+k) mod N and stays idle if this virtual output queue is empty. Thus, the output contention is also eliminated in the second switching network.

Although the first and second switching networks 4, 5 can be mere single-stage crossbars, in order to be scalable to large port counts they have to be multi-stage networks made of multiple crossbars.

Figure 2:
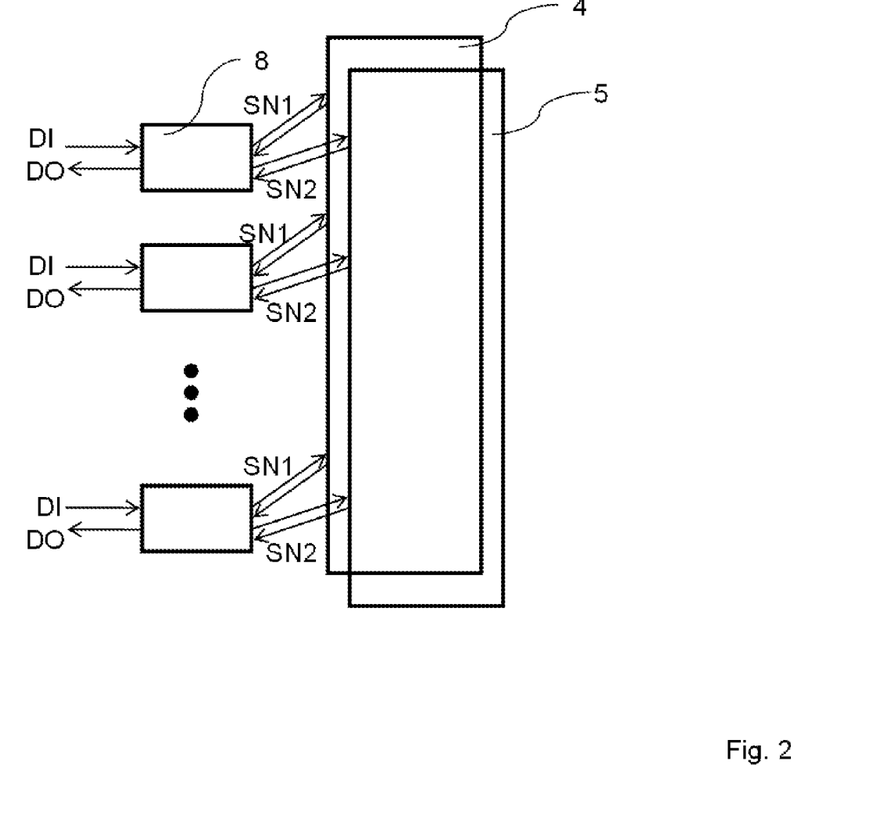
FIG. 2 shows a physical implementation of the load balanced network of FIG. 1.

FIG. 2 shows a physical implementation of the load-balanced network of FIG. 1. In the practical implementation only a number of N physical devices is used which combine at least one source node, at least one intermediate node and at least one destination node in one physical device. Each such a physical device has a data packet input DI, a data packet output DO and two bidirectional network connections SN1, SN2 one for each switching network.

To reduce latency of the load-balanced network as described above, a method of operating such a network is proposed herein which allows sending data packets outside of the predetermined connection schedules as determined by the cyclic sequence of one-to-one assignments as described above. Advantage is taken from the practical implementation which implies that each physical device typically comprises one source node, one intermediate node and one destination node. A consequence of such an implementation is that if a data packet is to be routed to an intermediate node that is incorporated in the same physical device as the destination node, there is no need to route the data packet through the second switching network.

In the following description, data packets which are sent according to the one-to-one assignment scheme are called "prescheduled" packets, while packets which are to be sent outside of the predetermined connection schedule are called "eager" packets.

Eager data packet injections may be performed in both the first switching network 4 and in the second switching network 5 so that four different methods to convey a data packet from one of the source nodes 2 to one of the destination nodes are generally possible:

1. According to the predetermined schedule of the first switching network 4, a packet is routed from the source node 2 to the intermediate node 6 corresponding to its destination node 3, as the destination node 3 is comprised in the same physical device as the intermediate node 6 (one-hop method).
2. The data packet is routed eagerly, i.e. not obeying the one-to-one-assignment schedule of the first switching network 4, to the intermediate node 6 corresponding to its destination node 3 as the destination node 3 is comprised in the same physical device as the intermediate node 6 (expedited one-hop method).
3. According to the one-to-one-assignment schedule of the first switching network 4, the data packet is routed to one of the intermediate nodes 6 not corresponding to its destination node 3 since the destination node 3 is not in the same physical device as the intermediate node 6 and is subsequently routed to its destination node 3 according to the one-to-one-assignment schedule of the second switching network 5 (two-hop method).
4. According to the one-to-one assignment schedule of the first switching network 4, the data packet is routed to an intermediate node 6 not corresponding to its destination node since the destination node 3 is not in the same physical device as the intermediate node 6, and is subsequently routed eagerly, i.e. outside the one-to-one assignment schedule of the second switching network 5 to its destination node 3 (expedited two-hop method).

Basically, the eager injection of data packets can be used for both the first switching network 4 and the second switching network 5 or for only one of these switching networks 4, 5. In a preferred embodiment, the eager injection of data packets is performed at least for the first switching network 4 since thereby a significant reduction of latency can be achieved due to the avoiding of the second switching network 5.

Figure 3:
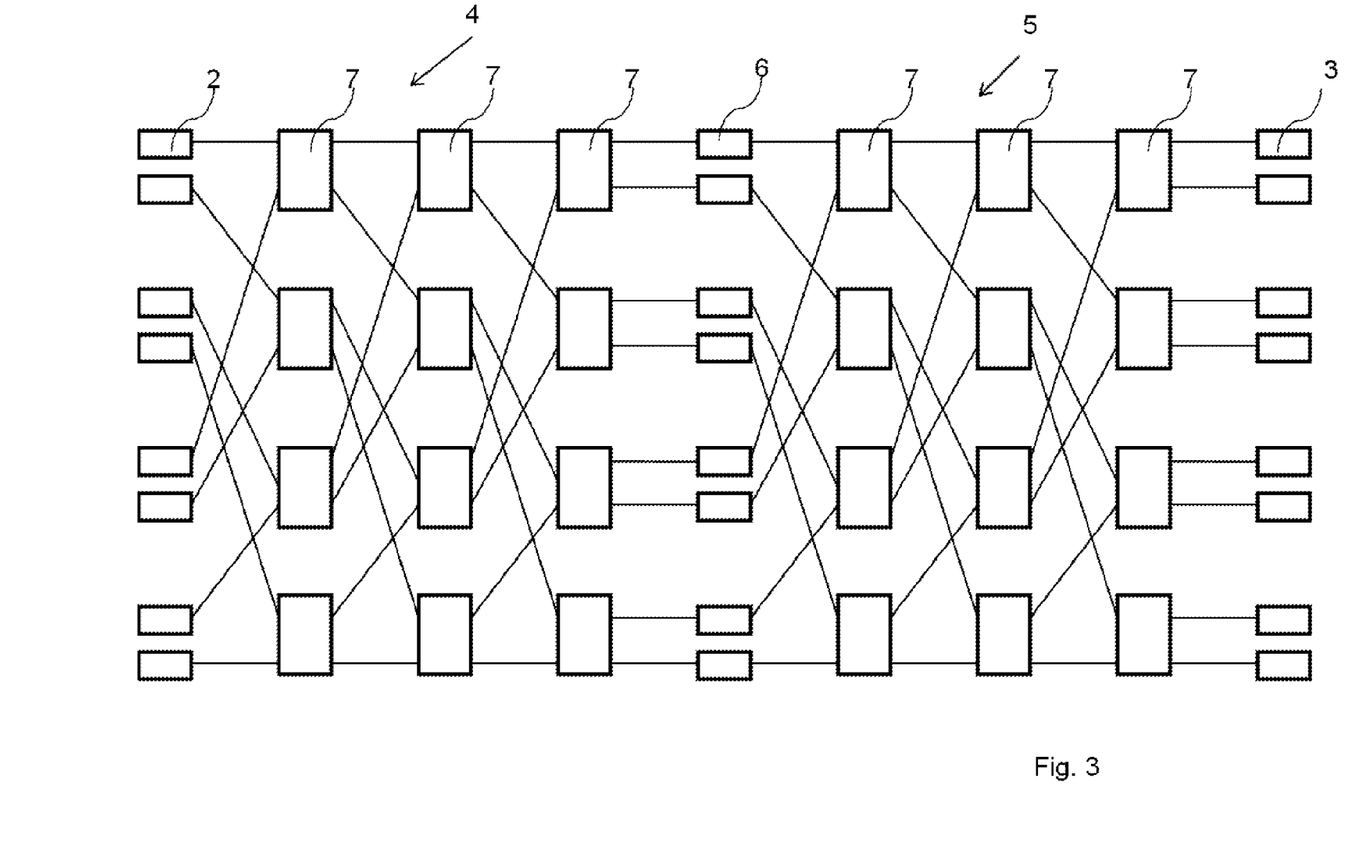
FIG. 3 shows a topology of the interconnection network with multi-stage switching networks having 2×2 switching elements.

Load-balanced networks such as a network as shown in FIG. 1 can include switching networks which might be implemented as multi-stage interconnection networks. For example, each switching network can be implemented by using Omega network, e.g. using two 8×8 Omega networks each comprising three stages of four 2×2 switching elements 7. Such a switching network is depicted in FIG. 3. Although in practice switching elements 7 are expected to have a larger number of ports such as 32, 64 or more it should be considered that a network implemented in this way may have significantly less cost than a fat-tree, while at the same time providing a one-to-one redundancy.

Each source node 2 and each intermediate node 6 may be adapted to store the incoming packets according to their destination node 3 in virtual output queues. A data packet transported according to the normal two-hop method is firstly routed from its source node 2 to a prescheduled intermediate node 6 and from the intermediate node 6 to its destination node 3 according to the prescheduled scheme just as done in the existing load-balanced network. The delay of the data packets at the intermediate nodes 6 can be as high as N time slots until the second switching network 5 offers the one-to-one assignment that will route the data packet to its destination node 3.

This delay can be avoided by using the expedited one-hop method or the expedited two-hop method. The decision about which of the transportation methods for the data packet is chosen can be made once the data packet reaches the head-of-line position of its respective virtual output queue of the source node 2 for the expedited one-hop method, or of the head-of-line position of the respective virtual output queue of the intermediate node 6 for the expedited two-hop method. However, every time the decision regarding the selection of the transportation scheme is re-evaluated, the packet stays in the head-of-line position of the respective queue.

Figure 4:
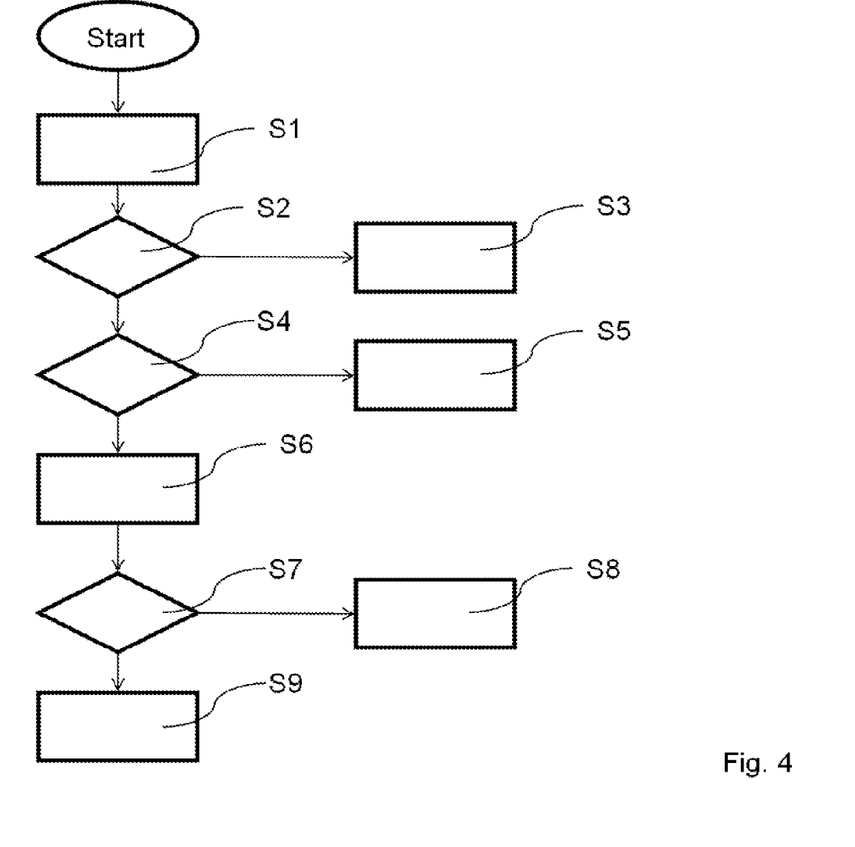
FIG. 4 shows a flow diagram to illustrate the steps of the method for operating an interconnection network.

In detail, FIG. 4 shows a flow diagram illustrating the steps for an embodiment of the present invention. In step S1 a data packet arrives at one of the source nodes 2 targeting for one of the destination nodes 3. In step S2 it is determined whether the prescheduled scheme assigns an/the intermediate node which is in the same physical device as the destination node 3 to which the data packet shall be sent. In this case (alternative: yes) the data packet is sent immediately to the intermediate/destination node in step S3.

If in step S2 it is determined that the prescheduled scheme does not offer an intermediate node 6 corresponding to the destination node 3 (alternative: no) it is determined in step S4 if the network load /utilization is above a predetermined threshold. If negative (alternative: no) the data packet is sent as an eager packet directly to the destination node 3 in step S5 thereby disregarding the prescheduled scheme. If it turns out in step S4 that the network load /utilization is above a predetermined threshold (alternative: yes) the data packet is forwarded to the prescheduled intermediate node 6 according to the one-to-one assignment in step S6.

In step S7 it is determined if the network load /utilization is above a predetermined threshold. If positive (alternative: yes) the data packet being buffered in the intermediate node 6 is sent according to the prescheduled one-to-one assignment to the destination node 3 in the respective time slot in Step S8. Otherwise (alternative: no) the data packet is sent as an eager data packet from the intermediate node 6 to the destination node 3 in step S9, thereby overruling the prescheduled scheme.

According to the above, a determination about the routing of the data packet may have the effect that eager data packets dominate when the network load/utilization is low, allowing the switching networks 4, 5 to handle the load. But in order to sustain high throughput at high network loads, prescheduled packets should gradually prevail as the network load and the contention increases. In order to suppress the eager routing of data packets at high network loads, the physical device may take into account the backlog of data packets in the virtual output queues. In other words, when the number of data packets that are currently queued in the virtual output queue of a source node 2, plus the number of data packets that are currently queued in the virtual output queues of the corresponding intermediate node which is physically implemented in the same physical device, exceeds a predetermined threshold TH, eager routing of data packets from that source node 2 and intermediate node 6 are prohibited. In other words, eager data packet injections are allowed only when this sum is below or equal to the threshold TH.

In a possible embodiment that follows this generic scheme, each switching element of the first switching network 4 contains a small packet queue for each output node. These small packet queues are used to store eager packets only. Prescheduled data packets never compete with each other since those injected at the same time slot form a cyclic one-to-one assignment and always overtake new or buffered eager data packets that compete with them for a switching element output. Effectively, prescheduled data packets never need to be queued within the switching elements and are never blocked at a respective node or switching element by flow control signals. On the other hand, an eager data packet may compete with other eager data packets or with prescheduled data packets. When there is a contention between an eager data packet and a prescheduled data packet, the prescheduled data packet is prioritized while the eager data packet is stored in a data packet queue within the switching element of the respective switching network or the respective node where the conflict takes place. When an eager data packet conflicts with another eager data packet, one of them is allowed to proceed and the other is queued. The priorization between them can e.g. be made according to their queuing time, i.e. the longer an eager data packet is waiting the higher the priority is.

According to the above method any eager data packet that was injected at a high load will not delay the advance of the prescheduled data packets that normally dominate in this regime and which are capable of sustaining high throughput.

According to another embodiment of the present invention, eager data packets are multiplexed with prescheduled data packets in the switching networks under equal terms. In this case both eager data packets and prescheduled data packets can be stored in network buffers, and a fair arbiter at the output of each switching element of the switching networks takes care that all packets, eager or prescheduled, receive equal service.

This embodiment modifies the basic load-balanced rules in the sense that prescheduled data packets can experience queuing delays within the switching networks 4, 5. If prescheduled data packets can be queued within the switching networks, this contradicts the time-sequence of the prescheduled one-to-one assignment between nodes, and thus the prescheduled data packets may conflict with each other. The prescheduled data packets, however, will still be uniformly distributed over all outputs of the switching networks 4, 5, i.e. a traffic pattern which is known to be able to handle the data packets at full throughput in buffered Omega networks.

On the other hand, eager data packets may not always be uniformly distributed over all outputs of the switching networks 4, 5. In some cases, eager data packets may even induce a congestion tree inside the switching networks 4, 5. Even if the source nodes 2 respond to such an event by stopping eager injections, the congestion tree may persist if the source nodes 2 continue injecting data packets at full rate. This might substantially reduce the effective throughput of the switching networks 4, 5. To prevent such throughput degradation, separate packet queues can be maintained and a discriminated flow control can be used for a prescheduled and eager data packets. Alternatively, the source nodes 2 can be forced to reduce their aggregate injection rate for a programmable amount of time, each time a threshold TH is exceeded.

According to another embodiment of the present invention, which is appropriate for an all-optical network implementation, the switching elements of the switching network do not include internal packet queues. This implies that eager data packets cannot be stored inside the switching networks so that they will be dropped when they conflict with prescheduled data packets inside the switching network. Alternatively, instead of directly dropping the eager data packets that are in conflict with prescheduled packets, in the optical network a resend of the eager data packets can be carried out to convey them through another wavelength. If the other wavelength is not available, the eager data packets will be dropped.

Similarly, when there is a link conflict among eager data packets, one of the eager data packets is allowed to proceed and the rest of the data packets will be dropped. To recover dropped data packets, source node and destination node participate in a reliable delivery protocol, wherein source nodes 2 maintain a copy of every eager data packet that they inject until they receive an acknowledgement message from the destination node 3 or the intermediate node 6 confirming the proper receipt of the data packet. When this acknowledgement message does not arrive within a time-out period after the injection, the source node 2 retransmits the data packet e.g. in a forced prescheduled mode.

Reference List 1 interconnection network
2 source node
3 destination node
4 first switching network
5 second switching network
6 intermediate node
7 switching element

The invention claimed is:

1. A method for transmitting one or more data packets from a first node to a selected second node of one or more second nodes connected by a switching network, the method comprising:

transmitting a data packet of the one or more data packets from the first node to the selected second node, wherein each of the one or more data packets is determined to be sent according to a first or a second transmission mode depending on a network condition;

wherein in the first transmission mode, the data packet is transmitted to the selected second node according to a prescheduled scheme, wherein the prescheduled scheme defines a cyclic one-to-one assignment between the first and the selected second node over a set of time slots so that the data packet is forwarded to the selected second node during a time slot for which the cyclic one-to-one assignment assigns the first node with the selected second node; and wherein in the second transmission mode, the data packet is transmitted during a current time slot from the first node to the selected second node, prior to the cyclic one-to-one-assignment assigning the first node with the second node, while overruling the prescheduled scheme.

2. The method according to claim 1, wherein it is determined whether the data packet is transmitted to the selected second node according to the first transmission mode or the second transmission mode, depending on an indication of a network load.

3. The method according to claim 2, wherein the network load is determined based on an amount of data packets buffered in the first node.

4. The method according to claim 1, wherein one or more first nodes are provided, wherein one or more of the one or more first nodes and one or more of the one or more second nodes are integrated in one physical device, wherein the data packet is transmitted directly from the first node to the selected second node not via the switching network if the first node and the selected second node are integrated in the one physical device.

5. The method according to claim 1, wherein the switching network is a multi-stage switching network having a plurality of switching elements arranged as a Banyan network or a Banyan equivalent network, wherein the switching elements buffer data packets in different queues according to the transmission mode.

6. The method according to claim 5, wherein a plurality of data packets is transmitted, wherein at least at one of the switching elements of the switching network one of the plurality of data packets which is sent according to the first transmission mode is prioritized over another one of the plurality of data packets sent according to the second transmission mode.

7. The method according to claim 6, wherein in one of the switching elements, one of the plurality of data packets sent according to the second transmission mode is dropped if one of the plurality of data packets which is sent according to the first transmission mode is forwarded by the switching element.

8. A method for transmitting a data packet through an interconnection network having one or more source nodes, one or more intermediate nodes and one or more destination nodes, wherein the one or more source nodes and the one or more intermediate nodes are connected via a first switching network, and the one or more intermediate nodes and the one or more destination nodes are connected via a second switching network, the method comprising:

transmitting the data packet, via the interconnection network, from a source node of the one or more source nodes to an intermediate node of the one or more intermediate nodes through the first switching network according to a transmission mode, wherein each data packet is determined to be sent according to a first or a second transmission mode depending on a network condition;

wherein in the first transmission mode, the data packet is transmitted from the source node to the intermediate node according to a prescheduled scheme, wherein the prescheduled scheme defines a cyclic one-to-one assignment between the source node and the intermediate node over a set of time slots so that the data packet is forwarded to the intermediate node during a time slot for which the cyclic one-to-one assignment assigns the source node with the intermediate node; and wherein in the second transmission mode, the data packet is transmitted during a first time slot from the source node to the intermediate node, prior to the cyclic one-to-one-assignment assigning the source node with the intermediate node, while overruling the prescheduled scheme; and transmitting from the intermediate node to a destination node, of the one or more destination nodes, through the second switching network according to a transmission mode, wherein each data packet is determined to be sent according to a first or a second transmission mode depending on a network condition;

wherein in the first transmission mode, the data packet is transmitted to the destination node according to a prescheduled scheme, wherein the prescheduled scheme defines a cyclic one-to-one assignment between the intermediate node and the destination node over a set of time slots so that the data packet is forwarded to the destination node during a time slot for which the cyclic one-to-one assignment assigns the source node with the destination node; and wherein in the second transmission mode, the data packet is transmitted during a second time slot from the intermediate node to the destination node, prior to the cyclic one-to-one-assignment assigning the intermediate node with the second node, while overruling the prescheduled scheme.

9. The method according to claim 8, wherein one or more of the intermediate nodes and one or more of the destination nodes are integrated in one physical device, wherein the data packet is transmitted according to the second transmission mode from the source node to the intermediate node if the destination node the data packet is to be sent to is integrated in the same physical device as the intermediate node.

10. The method according to claim 8, wherein the source node injects incoming data packets into the first switching network with an injection rate depending on a network load.

11. The method according to claim 8, wherein the network load is determined based on an amount of data packets buffered in the source node and/or intermediate node.

12. A network for transmitting one or more data packets, comprising:
a first node;
a number of second nodes;
a switching network connecting the first node with the number of second nodes, wherein the network is adapted to determine for each data packet whether it is sent according to a first or a second transmission mode, depending on a network condition;
wherein in the first transmission mode the data packet is transmitted to the second node according to a prescheduled scheme, wherein the prescheduled scheme defines a cyclic one-to-one assignment between the first and the second node over a set of time slots so that the data packet is forwarded to the second node during a time slot for which the cyclic one-to-one assignment assigns the first node with the selected second node; and
wherein in the second transmission mode the data packet is transmitted during a current time slot from the first node to the second node, prior to the cyclic one-to-one-assignment assigning the first node with the second node, while overruling the prescheduled scheme.

13. An interconnection network comprising:
a number of source nodes;
a number of intermediate nodes;
a number of destination nodes;
a first switching network for connecting the source nodes and the intermediate nodes; and
a second switching network for connecting the intermediate nodes and the destination nodes,
wherein the interconnection network is adapted to transmit the data packet from the source node to the intermediate node through the first switching network according to a transmission mode, wherein each data packet is determined to be sent according to a first or a second transmission mode depending on a network condition;
wherein in the first transmission mode, the data packet is transmitted to the intermediate node according to a prescheduled scheme, wherein the prescheduled scheme defines a cyclic one-to-one assignment between the source node and the intermediate node over a set of time slots so that the data packet is forwarded to the intermediate node during a time slot for which the cyclic one-to-one assignment assigns the source node with the intermediate node; and
wherein in the second transmission mode, the data packet is transmitted during a first time slot from the source node to the intermediate node, prior to the cyclic one-to-one-assignment assigning the source node with the intermediate node, while overruling the prescheduled scheme, and from the intermediate node to the destination node through the second switching network;
wherein in the first transmission mode, the data packet is transmitted to the destination node according to a prescheduled scheme, wherein the prescheduled scheme defines a cyclic one-to-one assignment between the intermediate node and the destination node over a set of time slots so that the data packet is forwarded to the destination node during a time slot for which the cyclic one-to-one assignment assigns the source node with the destination node; and
wherein in the second transmission mode, the data packet is transmitted during a second time slot from the intermediate node to the destination node, prior to the cyclic one-to-one-assignment assigning the intermediate node with the destination node, while overruling the prescheduled scheme.

14. A non-transitory computer readable storage medium tangibly embodying a computer readable program code having computer readable instructions which, when implemented, cause a computer to carry out the steps of a method of claim 1.

15. The method according to claim 2, wherein a number of first nodes is provided, wherein one or more of the first nodes and one or more of the second nodes are integrated in one physical device, wherein the data packet is transmitted directly from the first node to the selected second node not via the switching network if the first node and the selected second node are integrated in the one physical device.

16. The method according to claim 3, wherein a number of first nodes is provided, wherein one or more of the first nodes and one or more of the second nodes are integrated in one physical device, wherein the data packet is transmitted directly from the first node to the selected second node not via the switching network if the first node and the selected second node are integrated in the one physical device.

17. The method according to claim 9, wherein the source node injects incoming data packets into the first switching network with an injection rate depending on a network load.

18. The method according to claim 9, wherein the network load is determined based on an amount of data packets buffered in the source node and/or intermediate node.

19. The method according to claim 10, wherein the network load is determined based on an amount of data packets buffered in the source node and/or intermediate node.

20. The method according to claim 2, wherein the switching network is a multi-stage switching network having a plurality of switching elements arranged as a Banyan network or a Banyan equivalent network, wherein the switching elements buffer data packets in different queues according to the transmission mode.

* * * * *